United States Patent [19]
Simmers

[11] Patent Number: 5,907,330
[45] Date of Patent: May 25, 1999

[54] REDUCING POWER CONSUMPTION AND BUS BANDWIDTH REQUIREMENTS IN CELLULAR PHONES AND PDAS BY USING A COMPRESSED DISPLAY CACHE

[75] Inventor: Charles R. Simmers, Phoenix, Ariz.

[73] Assignee: Intel Corporation, Santa Clara, Calif.

[21] Appl. No.: 08/768,427

[22] Filed: Dec. 18, 1996

[51] Int. Cl.⁶ .................................................... G09G 5/00
[52] U.S. Cl. .................... 345/512; 345/202; 345/501; 365/226; 365/227; 365/228; 382/232; 382/233; 382/245; 382/246; 382/426; 382/427; 382/261.1
[58] Field of Search .................................. 345/202, 501, 345/507–509, 512, 526; 711/105, 106; 382/426, 427, 261.1, 232, 233, 245, 246; 365/226–228

[56] References Cited

U.S. PATENT DOCUMENTS

| | | | |
|---|---|---|---|
| 5,081,450 | 1/1992 | Lucas et al. | 345/202 |
| 5,129,011 | 7/1992 | Nishikawa et al. | 345/202 |
| 5,335,322 | 8/1994 | Mattison | 345/501 |
| 5,706,035 | 1/1998 | Tsunoda et al. | 345/202 |

*Primary Examiner*—Kee M. Tung
*Attorney, Agent, or Firm*—Blakely, Sokoloff, Taylor & Zafman LLP

[57] ABSTRACT

A method and apparatus for reducing power consumption and system bus load caused by a display controller in a unified memory system. A compression engine monitors a bus over which display data from the unified memory flows. The compression engine captures and compresses a copy of the display data corresponding to a display frame. The compressed data is stored in a small memory unit. Subsequent refreshes of the display are serviced by a decompression engine. The decompression engine decompresses the compressed data from the small memory unit and provides the decompressed data to the display controller.

9 Claims, 3 Drawing Sheets

REDUCING POWER CONSUMPTION AND BUS BANDWIDTH REQUIREMENTS IN CELLULAR PHONES AND PDAS BY USING A COMPRESSED DISPLAY CACHE

BACKGROUND OF THE INVENTION (1) Field of the Invention

The invention relates to power savings in a unified memory environment. More specifically, the invention relates to unobtrusively capturing display data and storing it in a display buffer for refreshing the static display.

(2) Related Art

It is relatively common in prior art embedded systems to employ a unified memory subsystem. The main memory has a portion allocated as a frame buffer for the system display. The frame buffer holds one frame of display data. Accordingly, the host processor and display controller share the memory, and the display controller must steal bus bandwidth from the host processor in order to interleave its fetches from the memory to refresh the display. Moreover, when the main memory would be otherwise powered down, it must be kept active in order to service the display controller. This can represent a power drain an order of magnitude greater than if the main memory could power down in such circumstances.

Some prior art systems have employed a frame buffer which is separate from the main memory. However, providing an additional one to two megabytes, or even 128 kilobytes, of memory significantly increases the cost of such embedded systems. For this reason, embedded systems have continued to use the unified memory system, and the deficiencies discussed above have gone largely unaddressed.

In view of the foregoing, it would be desirable to be able to reduce both power consumption and bus bandwidth drain resulting from unified memory subsystems' handling of display data. It would further be desirable to address these issues without requiring hardware modifications in either the display controller or the host processor.

BRIEF SUMMARY OF THE INVENTION

A method and apparatus for reducing power consumption and system bus load caused by a display controller in a unified memory system is disclosed. A compression engine monitors a bus over which display data from the unified memory flows. The compression engine captures and compresses a copy of the display data corresponding to a display frame. The compressed data is stored in a small memory unit. Subsequent refreshes of the display are serviced by a decompression engine. The decompression engine decompresses the compressed data from the small memory unit and provides the decompressed data to the display controller.

In one embodiment, the monitoring of the bus is completely transparent to the other devices on the bus, and the decompression engine provides data over dedicated lines. This avoids the drain on system bus bandwidth that would otherwise exist if display controller fetches were to be serviced by main memory. Because the display controller can refresh the display independent of the main memory, the main memory can be powered down when the host processor is inactive, thereby achieving significant power savings.

DETAILED DESCRIPTION OF THE INVENTION

Figure 1:
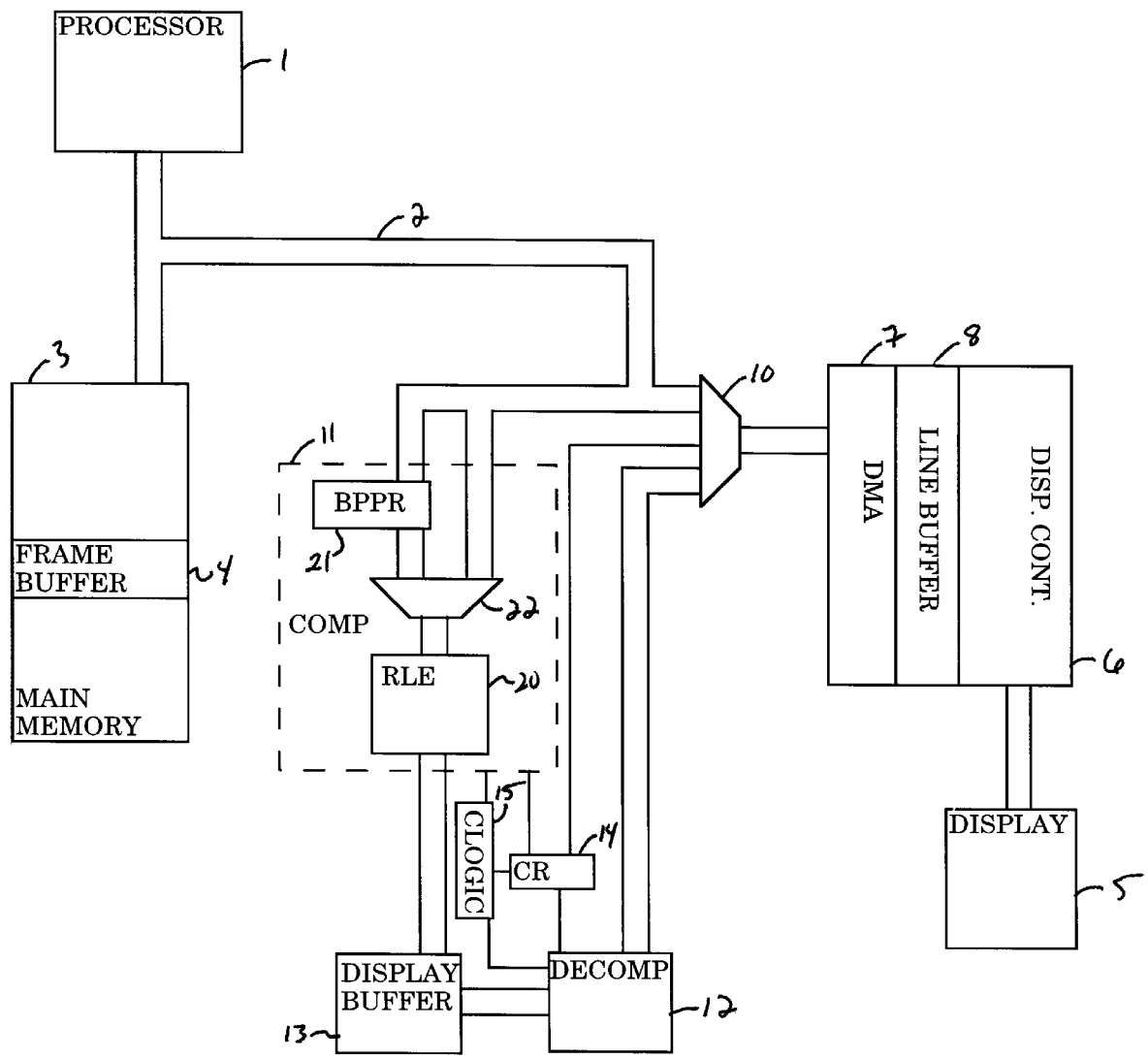
FIG. 1 is a block diagram of a system employing one embodiment of the invention.

FIG. 1 is a block diagram of a system employing one embodiment of the invention. A processor 1 is coupled to a bus 2. A unified memory is also coupled to bus 2. In the unified memory, main memory 3 has a portion thereof allocated as a frame buffer 4. Also coupled to bus 2 is dedicated direct memory access controller (DMA) 7 which exacts display data from the frame buffer 4 and puts the display data in the line buffers 8 to be output by the display controller 6 to the display 5. All of the foregoing are generally well known in the art. Cellular phones and personal digital assistants (PDAs) commonly employ such unified memory systems. One of ordinary skill will recognize that reduction in power consumption is particularly important in such battery-powered systems.

In one embodiment of the invention, a compression engine 11 is coupled to bus 2 and monitors bus 2 for data flowing from the frame buffer 4 to the display controller 6 in response to a request by DMA 7. As the data flows to the display controller 6, the compression engine 11, if enabled, captures the data and compresses it into display buffer 13. In one embodiment, compression engine 11 includes a bit-per-pixel reducer 21 and a compression unit 20 employing run-length encoding (RLE) to compress the data. The bit-per-pixel reducer decreases the number of displayable colors or gray scales. In the extreme, it permits the display to be reduced to monochrome, thereby reducing by a factor of four for 4 bpp or two for 2 bpp, the memory required to store a particular display image. This also greatly reduces the power consumed by both the display controller and the display. The reduction in bits per pixel is performed using known dithering techniques. Significantly, the underlying data in the frame buffer 4 remains unchanged. A selection unit 22 is provided between the bit-per-pixel reducer 21 and the compression unit 20 to select between the data output by the bit-per-pixel reducer 21 or the raw data flowing on bus 2. The selected data becomes the input to the compression unit 20.

It will be understood by one of ordinary skill in the art that the bit-per-pixel reducer 21 and the selection unit 22 might be eliminated and the raw data fed directly into the compression unit 20, without departing from the scope or contemplation of the invention. Additionally, other encodings might be used instead of or in addition to RLE. For example, adaptive Huffman algorithms or proprietary compression algorithms might be employed by the compression unit 20 without departing from the scope and contemplation of the invention.

Display buffer 13 is a small memory unit selected to be of the smallest size capable of holding one complete frame of compressed data. For example, if the frame size is 128K, the display buffer 13 may be 8K. It is desirable to have the display buffer 13 as small as possible because larger size increases cost, space required, and power by the display buffer. Nevertheless, employing a display buffer that is larger than the minimum is within the scope and contemplation of the invention.

Display buffer 13 is coupled to decompression engine 12 and provides data to the display controller 6 when selection unit 10 selects the output of the decompression engine 12 and the display controller 6 issues a refresh request to refresh the display 5. Decompression engine 12 restores the data stored in the display buffer to an uncompressed form from the compressed form that resulted from the compression by compression unit 20, but it will not, of course, restore bits reduced by the bit-per-pixel reducer 21.

Control register 14 is used in conjunction with control logic 15 to control the compression/decompression subsystem. In one embodiment, the control register includes a frame buffer select bit (FBS), a frame buffer dirty bit (FBD), a display buffer select bit (DBS), and a compression complete bit (CC). Control logic 15 includes one or more state machines responsive to setting and clearing of bits in the control register. How these bits effect the operation of the compression/decompression subsystem is discussed further below in connection with the state diagrams of FIGS. 2 and 3. In an embodiment including a bit-per-pixel reducer, one or more BPPR bits should be provided to enable/disable the bit-per-pixel reducer. Throughout this specification, Applicant discusses setting and clearing of bits in the control register. It is readily understood by one of ordinary skill in the art that setting may imply that the bit is caused to be either 0 or 1, and clearing is merely the opposite of setting. Through convention only, it will be assumed that a bit is set when it is 1 and is cleared when it is 0. However, one of ordinary skill in the art will recognize that this need not be the case, and setting to 0 and clearing to 1 is within the scope and contemplation of the invention.

If the FBS bit is set, all display refreshes and all display data, generally, is required to be provided by the frame buffer 4. Thus, the decompression engine 12 can be viewed as disabled by the FBS bit or simply non-selected by selection unit 10. In one embodiment, if the FBS bit is set, the compression engine is also disabled by maintaining the CC bit and the FBD bit set as discussed below. Thus, in such embodiment, by setting FBS, one can avoid churning the compression engine on a known incompressible image or where, e.g., animation precludes refreshing a static image.

Setting of the FBD bit (and clearing of the CC bit) occurs responsive to a write to the frame buffer 4 or a reset of the display controller 6. If the FBD bit is set, the compression engine 11 is enabled (unless as indicated above, the FBS bit disables the compression engine) to capture data directed to the display controller from bus 2. This data capture is completely transparent to both the frame buffer 4 that provides the data (as well as the host processor) and the display controller 6. When the compression engine 11 has captured and compressed the complete frame of display data into display buffer 13, it sets the CC bit and clears the FBD bit. If the image is sufficiently complex that the compression engine 11 cannot compress the frame of data into display buffer 13, an overflow will occur and the FBD will be cleared, but the CC bit will not be set. This causes the selection unit 10 to continue to select the frame buffer 4 as the source of the display data for refreshing the display.

If the DBS bit is set, selection unit 10 forces the decompression engine to source data in response to refresh requests even in the event that a write to the frame buffer has caused the FBD bit to be set. DMA 7 merely issues the normal request it would for frame buffer data, and it does not know or care what unit responds.

Figure 2:
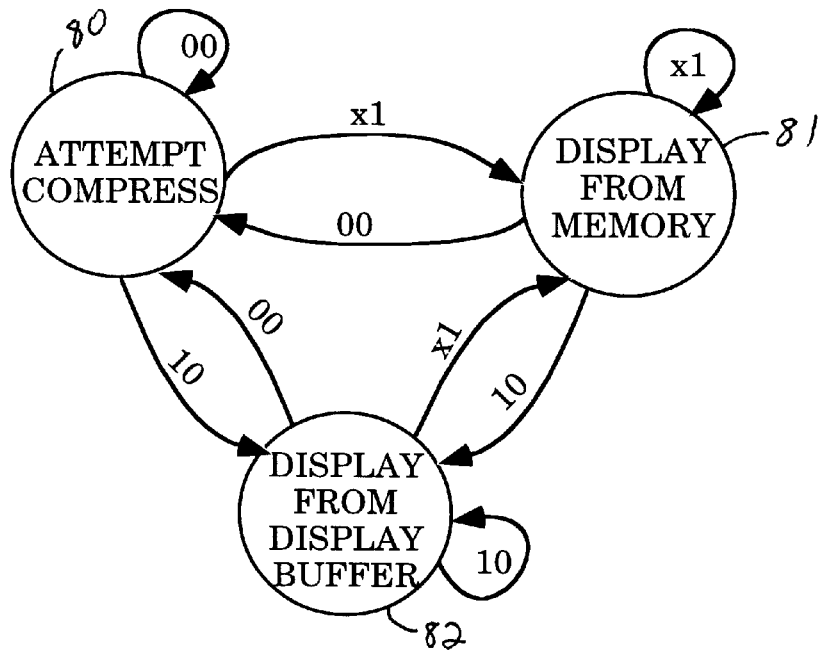
FIG. 2 is a state diagram showing states and transitions responsive to different combinations of the DBS and FBS bits.

FIG. 2 is a state diagram showing states and transitions responsive to different combinations of the DBS and FBS bits. The attempt to compress state 80 occurs when neither of these bits are set. In this state, the compressor initially attempts to compress the data and if successful, data is subsequently supplied from the display buffer. State 80 is actually composed of a substate diagram shown in FIG. 3. State 81 occurs anytime the FBS bit is set, regardless of the prior state or the condition of the DBS bit. In the display from memory state 81, display data is always retrieved from the frame buffer in main memory. This is true even if data is compressible and, for that matter, has been successfully compressed. The display from buffer state 82 occurs when the FBS bit is not set and the DBS bit is set. In this state, a display data is provided to display controller from the display buffer even if the host processor has subsequently written to the frame buffer since the last compression.

Figure 3:
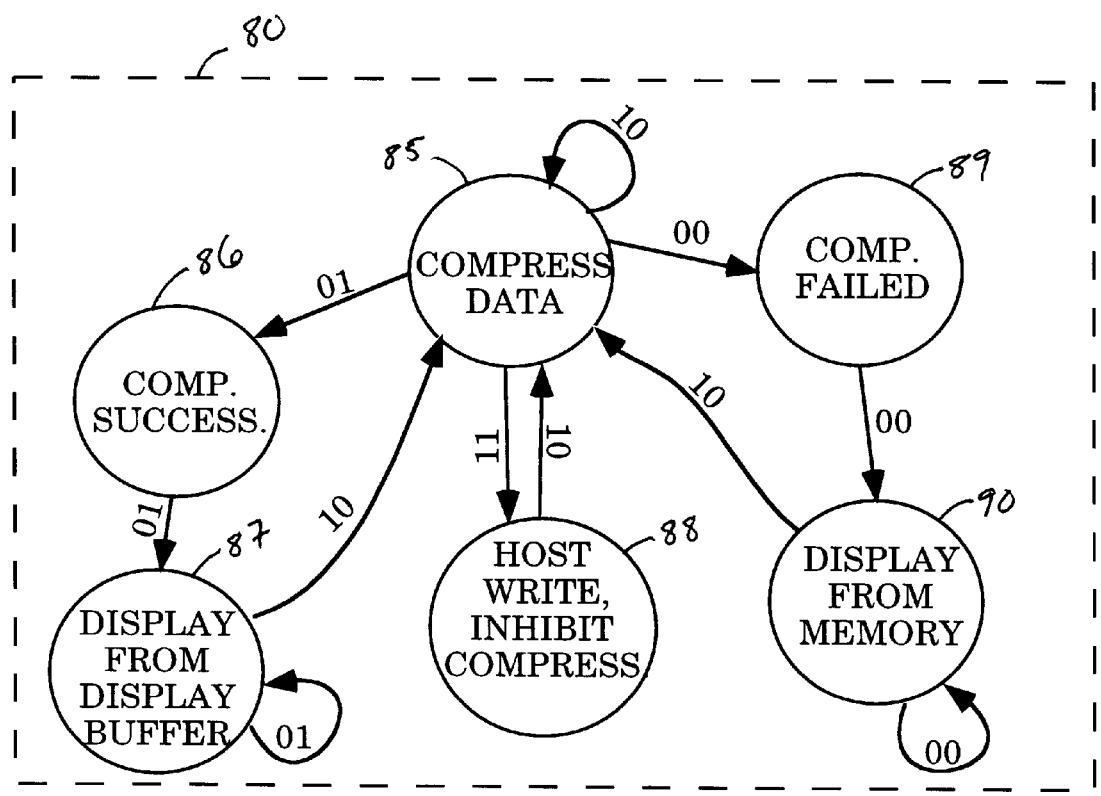
FIG. 3 is a substate diagram of state 80 with transitions responsive to the FBD bit and the CC bit.

FIG. 3 is a substate diagram of state 80 with transitions responsive to the FBD bit and the CC bit. In the compressed data state 85, FBD bit is set, and the CC bit is cleared. If it is determined that the data is incompressible, the frame FBD bit is cleared, resulting in a transition to the compression fail state 89, which in turn transitions to the display from memory state 90. The system remains in the display for memory state until the FBD bit is set again which suggests that compressible data might now be available and results in a transition back to the compress data state 85. If the compression is successful, the FBD bit is cleared and the CC bit is set, and the state machine transitions to the compression successful state 86 and then, in turn, to the display from display buffer state 87. The state machine remains in the display from display buffer state 87 until a subsequent write to the frame buffer causes the FBD bit to be set and the CC bit to be cleared, at which point the state machine transitions back to the compressed data state 85. The host write inhibit compression state 88 occurs only when the FBS bit is set (and, thus, results in a transition to state 81 of FIG. 2). However, it effectively prevents the compression engine from compressing a now dirty frame buffer resulting from a frame host write. This is desirable when, e.g., animation necessitates many updates to the frame buffer in succession. In this way, power drain associated with operating the compression engine can be avoided. When the FSB bit is cleared, the CC bit will also be cleared and a state machine will transition from state 88 back to the compressed data state 85.

Accordingly, when a refresh is required, the DMA 7 issues a request for the desired frame buffer address range. If the DBS bit is set or if all of DBS, FBS and FBD are cleared and CC is set, the selection unit 10 routes the request to the decompression engine 12 which decompresses the data from the display buffer 13 and provides it to the display controller 6 (via the line buffers 8 for output to the display). In this case, the request by the DMA 7 is never seen on the bus 2. Therefore, no bus bandwidth is used for a refresh from the display buffer 13, and the display controller 6 need not steal bus cycles from the host processor when the date is available in the display buffer 13. Additionally, the main memory can then be placed in a reduced power state as though the memory were not unified because the main memory need not service the display controller. This reduces the power drain while in a reduced power state by an order of magnitude over prior art systems in which the main memory was required to remain active to service display refreshes.

Figure 4:
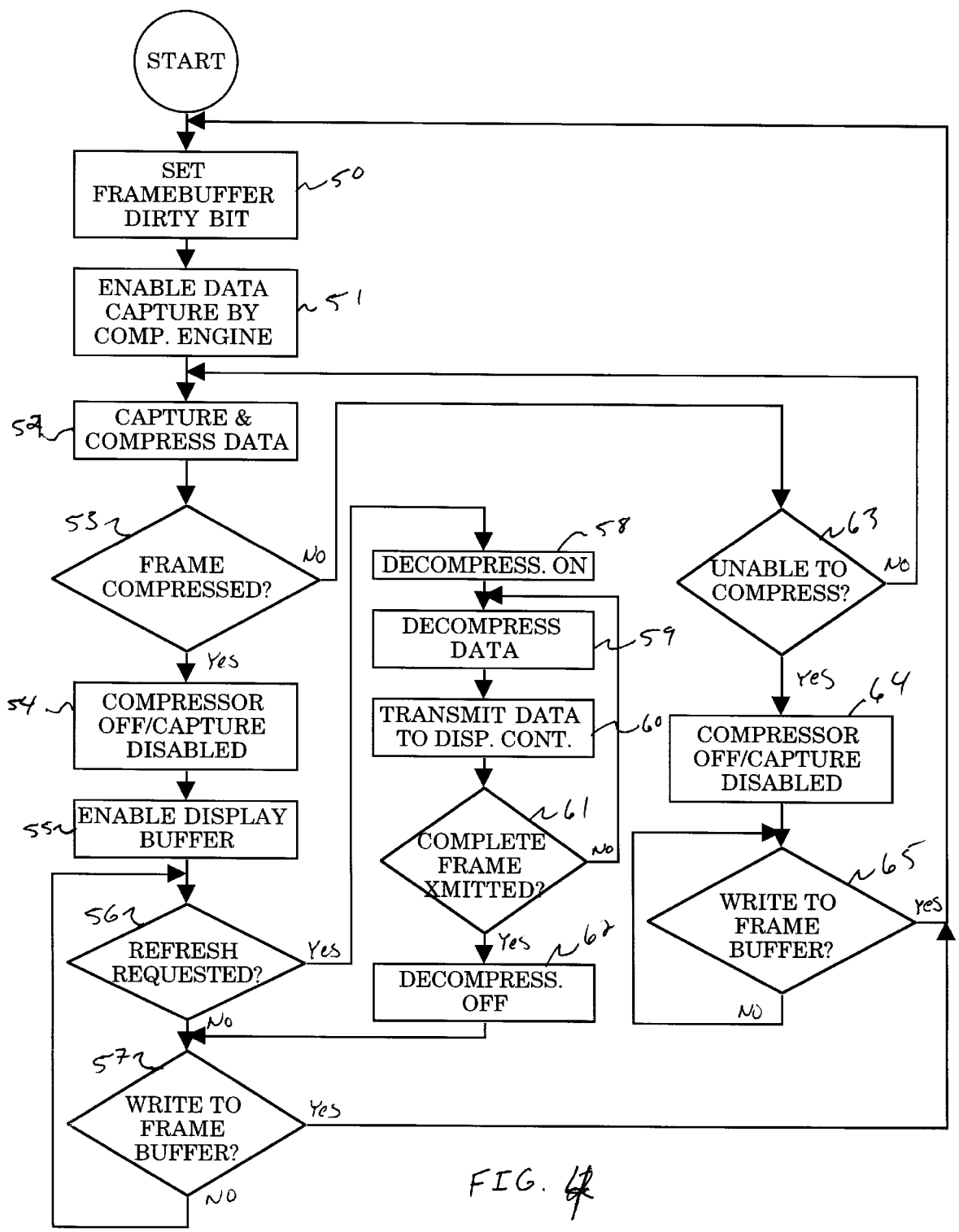
FIG. 4 is a flowchart of operation of the compression/decompression subsystem in one embodiment of the invention.

FIG. 4 is a flowchart of operation of the compression/decompression subsystem in one embodiment of the invention. At functional block 50, the FBD bit is set. The setting of the frame buffer dirty bit may be in response to a display controller reset or a write to the frame buffer by a host processor. In response to the frame buffer bit being set dirty, the compression engine is enabled to capture data at functional block 51. When data flows from the frame buffer to the display controller, the compression engine unobtrusively captures the data from the bus and compresses it, placing the compressed data in a display buffer at functional block 52. At functional block 53, a determination is made if a complete frame has been compress. If a complete frame has been compressed, at functional block 54, the compression engine is turned off, disabling the capture and the FBD bit is cleared.

At functional block 55, the display buffer is enabled to provide data in response to a refresh request. At decision block 56, a determination is made if a refresh has been requested. If no refresh has been requested at decision block 57, a check is made to see if the frame buffer has been written to since last compression. If it has, the FBD bit is set again and the process continues from functional block 50. If there has been no write to the frame buffer, then a check is again made to see if a refresh has been requested at functional block 56. If a refresh is requested, the decompression engine turned on at functional block 58. At functional block 59, data is decompressed and at functional block 60, the data is to the display controller via the DMA and line buffers. The display control handles such data in the usual manner. At decision block 61, determination is made if a complete frame has been transmitted. If it has not, more data is decompressed and transmitted in functional blocks 59 and 60, respectively. If a complete frame has been transmitted, the decompressor is turned off at functional block 62, and the flow continues at decision block 57.

If at decision block 53 the frame was not compressed, a determination is made whether the failure to complete the compression was because the data is not compressible. If the compression engine is unable to compress the data, the compressor is turned off, the capture is disabled at functional block 64, but the frame buffer dirty bit need not be cleared. At decision block 65, a determination is made if the write to frame buffer has occurred. If it has not, the system loops until a write to frame buffer occurs which may indicate that newly compressible data has been written to the frame buffer. If the failure to compress the frame is not as a result of incompressible data, more data is captured and compressed at functional block 52.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system having no dedicated frame buffer comprising:
   a system bus;
   a host processor coupled to the system bus;
   a main memory coupled to the system bus and having a frame buffer implemented therein;
   a display controller coupled to the system bus;
   a display coupled to the display controller;
   a compression engine coupled to the system bus, the compression engine to capture and compress a copy of display data directed to the display controller from the main memory;
   a storage unit coupled to the compression engine storing data captured and compressed by the compression engine;
   a decompression engine coupled to the display controller and the storage unit, the decompression engine decompressing data from the storage unit and transmitting the data to the display controller; and
   wherein the main memory can be placed in a reduced power state even though the display controller periodically refreshes the display.

2. The system of claim 1 wherein the compression engine captures display data when a frame buffer dirty bit is set to a predetermined value.

3. The system of claim 1 wherein the compression engine does not capture display data even though a frame buffer dirty bit is set while a second predetermined condition exists.

4. The system of claim 1 wherein the storage unit is sized to contain exactly one frame of compressed display data.

5. The system of claim 1 wherein the display controller refreshes the display using the data provided by the decompression engine such that the main memory is not used during a refresh.

6. The system of claim 1 wherein the decompression engine transmits data to the display controller over dedicated lines, thereby reducing demand by the display controller for bandwidth on the system bus.

7. A method of reducing power consumption in a computer system having a frame buffer implemented as part of a unified memory, the method comprising:
   capturing a frame of display data from a bus as the frame is transmitted from the frame buffer to a display controller;
   compressing the frame of display data captured from the bus;
   storing the frame in a compressed form in a small storage unit;
   decompressing the compressed form from the small storage unit to refresh a display while an image on the display remains static; and
   placing the unified memory in a reduced power state while the display is refreshed from the small storage unit.

8. The method of claim 7 wherein the step of compressing comprises the step of:
   reducing a number of bits from which a pixel of display data is derived.

9. The method of claim 7 wherein the step of capturing is performed transparently to both a host processor and a display controller.

* * * * *

UNITED STATES PATENT AND TRADEMARK OFFICE
CERTIFICATE OF CORRECTION

PATENT NO. : 5,907,330                                    Page 1 of 1
DATED       : May 25, 1999
INVENTOR(S) : Simmers It is certified that error appears in the above-identified patent and that said Letters Patent is hereby corrected as shown below:

Column 2,
Line 63, after "power" insert -- consumed --.

Column 5,
Line 6, delete "compress" and insert -- compressed --.
Line 20, after "engine" insert -- is --.
Line 23, delete "control" and insert -- controller --.

Signed and Sealed this

Twenty-sixth Day of February, 2002

Attest:

JAMES E. ROGAN
Attesting Officer             Director of the United States Patent and Trademark Office